United States Patent
Nomura et al.

[19]

[11] Patent Number: 6,115,189
[45] Date of Patent: Sep. 5, 2000

[54] MULTI-STAGE EXTENSION TYPE ZOOM LENS BARREL

[75] Inventors: Hiroshi Nomura, Saitama-ken; Kazuyoshi Azegami, Tokyo; Takamitsu Sasaki, Saitama-ken; Kazunori Ishizuka, Kanagawa-ken, all of Japan

[73] Assignee: Asahi Kogaku Kabushiki Kaisha, Tokyo, Japan

[21] Appl. No.: 09/083,037

[22] Filed: May 22, 1998

[30] Foreign Application Priority Data

May 23, 1997 [JP] Japan .................................. 9-133665
Oct. 28, 1997 [JP] Japan .................................. 9-295478

[51] Int. Cl.$^7$ .................................................. G02B 15/14
[52] U.S. Cl. ............................................................ 359/694
[58] Field of Search ................................... 359/694, 699, 359/700, 701

[56] References Cited

U.S. PATENT DOCUMENTS

| | | | |
|---|---|---|---|
| 5,349,475 | 9/1994 | Nomura et al. | 359/694 |
| 5,467,227 | 11/1995 | Nomura | 359/694 |
| 5,659,810 | 8/1997 | Nomura et al. | 396/72 |
| 5,774,748 | 6/1998 | Ito et al. | 396/80 |
| 5,862,416 | 1/1999 | Nishimura | 396/72 |

*Primary Examiner*—Ricky Mack
*Attorney, Agent, or Firm*—Greenblum & Bernstein, P.L.C.

[57] ABSTRACT

A zoom lens barrel includes a stationary barrel; a first rotational feed barrel which is engaged with the stationary barrel by means of helicoids; a first linear movement barrel which is engaged with the first rotational feed barrel so as to relatively rotate and to relatively move together along the optical axis and which is provided on the inner peripheral surface thereof with a female helicoid; a second rotational feed barrel which has a male helicoid and a female helicoid on the outer and inner peripheral surfaces thereof respectively; a rotational transmission barrel which is engaged with the first rotational feed barrel so as to relatively move along the optical axis and to rotate together, and which is integrally connected to the second rotational feed barrel; a second linear movement barrel which is provided on outer peripheral surface thereof with a male helicoid which engages with the female helicoid of the second rotational feed barrel; a lens group that is held by said second rotational feed barrel; and at least one lens group which is guided to linearly move independently of the second linear movement barrel.

6 Claims, 7 Drawing Sheets

MULTI-STAGE EXTENSION TYPE ZOOM LENS BARREL

BACKGROUND OF THE INVENTION

1. Field of the Invention

The present invention relates to a zoom lens barrel, and in particular, it relates to a multi-stage (in particular three-stage) extension type zoom lens barrel and a helicoid extension type zoom lens barrel.

2. Description of the Related Art

In conventional zoom compact cameras, it is preferable that the thickness (length) of the camera when not in use be at a minimum. To this end, a multi-stage extension type zoom lens barrel which has three stages has been employed. In the conventional three-stage extension type zoom lens barrel, a feed mechanism which transmits the drive force of a zoom motor to each lens barrel member is complex; requires maintenance; and makes the camera heavy and large. For example, in the conventional three-stage extension type zoom lens barrel, a second rotational barrel is provided in a second feed stage so as to move to in the direction of the optical axis with respect to a first feed stage upon rotation thereof. As means for to achieve such movement of the second rotational barrel, a helicoid engagement mechanism is well known. However, it is difficult to feed barrel members engaged by helicoids by only applying force in the direction of axis. Accordingly, if the second rotational barrel engages with a first rotational barrel of the first feed stage by means of helicoids, there will be need to provide a rotational transmission mechanism that transmits the rotational force of the first rotational barrel to the second rotational barrel. Such a rotational transmission mechanism is the major cause of making the feed mechanism of the zoom lens barrel complex. Of cause, this problem resides not only in three-stage extension type feed mechanisms but also in any multi-stage extension zoom lens barrel which needs to provide a rotational transmission mechanism between the feed stages.

A cam extension type rotation-feed mechanism for a zoom lens barrel is also known, in which a pair of barrel members are respectively provided on the opposed peripheral surfaces with a spiral lead groove (cam groove) and a projection which engages in the cam groove to extend the lens barrel. In the cam extension type, however, since the length of engagement between the barrel members is small, the rigidity of the lens barrel tends to be insufficient.

In general, in a multi-stage extension type zoom lens barrel, upon zooming, an inner barrel (cylinder) is moved or advanced relative to an outer barrel (cylinder) whose diameter is larger than that of the inner barrel. In this state, the inner barrel can be seen externally. Therefore, in order to prevent an external helicoid (male helicoid) provided on the outer peripheral surface of the inner barrel from being exposed to the outside, the male helicoid extends in the axial direction only by a length necessary to provide the maximum extension of the inner barrel, while an internal helicoid (female helicoid) provided on the inner peripheral surface of the outer barrel extends in the whole range of the movement. Consequently, the thickness of the portion of the inner barrel on which no external helicoid is formed is smaller than that of the remaining portion of the inner barrel, thus resulting in a reduced strength of the lens barrel. Moreover, if the range of the engagement between the external helicoid and the internal helicoid is small, there is a fear that light enters a space between the outer and inner barrels.

If it is accepted that the external helicoid formed on the inner barrel can be seen from outside, it is possible to provide the external helicoid on the entire peripheral surface of the inner barrel. However, if the external helicoid formed on the entire peripheral surface of the inner barrel engages with the internal helicoid formed on the entire peripheral surface of the outer barrel, the following problems arise. In general, the barrel components of a compact camera are made of a plastic mold or the like, and hence it is difficult to produce the barrel components accurately (e.g., roundness, etc.). Consequently, if the length of the engagement of the external and internal helicoids is long, the movement of the barrel member(s) interfere with the helicoids during the extension or retraction of the barrel member(s) due to a dimensional error, etc., thus resulting in a non-smooth movement of the barrel member(s). Namely, in the conventional helicoid extension type zoom lens barrels, it has been difficult to achieve sufficient strength and effective light interception together with smooth movement of the barrel members.

SUMMARY OF THE INVENTION

It is an object of the present invention to provide a multi-stage (in particular three-stage) extension type zoom lens barrel in which the strength is increased and the extension mechanism is simplified.

Another object of the present invention is to provide a helicoid extension type zoom lens barrel in which the strength of the lens barrel can be increased and the light interception ability can be enhanced while ensuring a smooth movement of the barrel members.

According to an aspect of the present invention, there is provided a zoom lens barrel constituting: a stationary barrel that is integral with a camera body; a first rotational feed barrel which is engaged with the stationary barrel by means of helicoids so as to be movable in the direction of the optical axis upon rotation thereof; a first linear movement barrel which is located inside of the first rotational feed barrel and which is guided to linearly move in the direction of the optical axis, the first linear movement barrel being engaged with the first rotational feed barrel so as to relatively rotate and to move in the direction of the optical axis together, and the first linear movement barrel being provided on the inner peripheral surface thereof with a female helicoid; a second rotational feed barrel having a male helicoid and a female helicoid which are provided on the outer and inner peripheral surfaces thereof respectively; a rotational transmission barrel which is engaged with the first rotational feed barrel so as to relatively move in the direction of the optical axis and to rotate together, and which is integrally connected to the second rotational feed barrel; a second linear movement barrel which is guided to linearly move in the direction of the optical axis and which is provided on outer peripheral surface thereof with a male helicoid which engages with the female helicoid of the second rotational feed barrel; a lens group that is held by the second linear movement barrel; and at least one lens group, separate from the second linear movement barrel lens group, which is guided by the second linear movement barrel to linearly move independently of the second linear movement barrel.

Preferably, in the three-stage extension type zoom lens barrel constructed as above, a cam groove to determine the position of the at least one lens group is formed on said inner peripheral surface of the second rotational feed barrel by cutting away a part of the female helicoid.

According to another aspect of the present invention, there is provided a zoom lens barrel constituting: a stationary barrel that is integral with a camera body; a first rotational feed barrel which is engaged with the stationary barrel so as to be moved in the direction of the optical axis upon rotation thereof; a first linear movement barrel which is located inside of the first rotational feed barrel and which is guided to linearly move in the direction of the optical axis, the first linear movement barrel being engaged with the first rotational feed barrel so as to relatively rotate and to move in the direction of the optical axis together; a second rotational feed barrel which is engaged with the inside of the first linear movement barrel so as to move in the direction of the optical axis upon rotation thereof; and a rotational transmission barrel located between the first rotational feed barrel and the first linear movement barrel, the rotational transmission barrel being engaged with the first rotational feed barrel so as to relatively move in the direction of the optical axis and to rotate together, and being integrally connected to the second rotational feed barrel.

According to yet another aspect of the present invention, there is provided a zoom lens barrel comprising at least a pair of barrel members which includes a small diameter barrel member which is provided on its outer peripheral surface with a male helicoid and a large diameter barrel member which is provided on its inner peripheral surface with a female helicoid, so that the feed operation is carried out in accordance with the engagement of said male and female helicoids, wherein either the male helicoid or the female helicoid includes: an engaging helicoid portion and a non-engaging helicoid portion which are provided on separate axial positions of the barrel members; the engaging helicoid portion being engaged with the helicoid provided on the other barrel member; and the non-engaging helicoid portion not being engaged with the helicoid provided on the other barrel member.

With this arrangement, since the non-engaging helicoid does not perfectly engage with the mating helicoid, the length of the engagement is limited to the engagement by the engaging helicoid portion, and hence a smooth advance or retraction of the barrel members can be ensured if there is a slight dimensional error thereof. Moreover, since the thickness of the non-engaging portion is increased by a value corresponding to the non-engaging helicoid, the strength of the zoom lens barrel can be enhanced. Since the non-engaging helicoid has a certain height in the direction perpendicular to the optical axis, light interception between the barrel members can be enhanced.

If the non-engaging helicoid portion is provided on the inner peripheral surface of the large diameter barrel member, it is preferable that the engaging helicoid portion has a predetermined length from the front end of the inner peripheral surface in the axial direction of the large diameter barrel member, thus resulting in an increase in the amount of feed of the barrel members.

Likewise, if the non-engaging helicoid portion is provided on the outer peripheral surface of the small diameter barrel member, it is preferable that the engaging helicoid portion has a predetermined length from the rear end of the outer peripheral surface in the axial direction of the small diameter barrel member.

For a smooth movement of the barrel members, it is preferable that the length of the peripheral surface in which the non-engaging helicoid portion is formed, in the axial direction, is longer than at least the length of the engaging helicoid portion.

The present disclosure relates to subject matter contained in Japanese Patent Applications No. 09-133665 (filed on May 23, 1997) and No. 09-295478 (filed on Oct. 28, 1997) which are expressly incorporated herein by reference in their entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
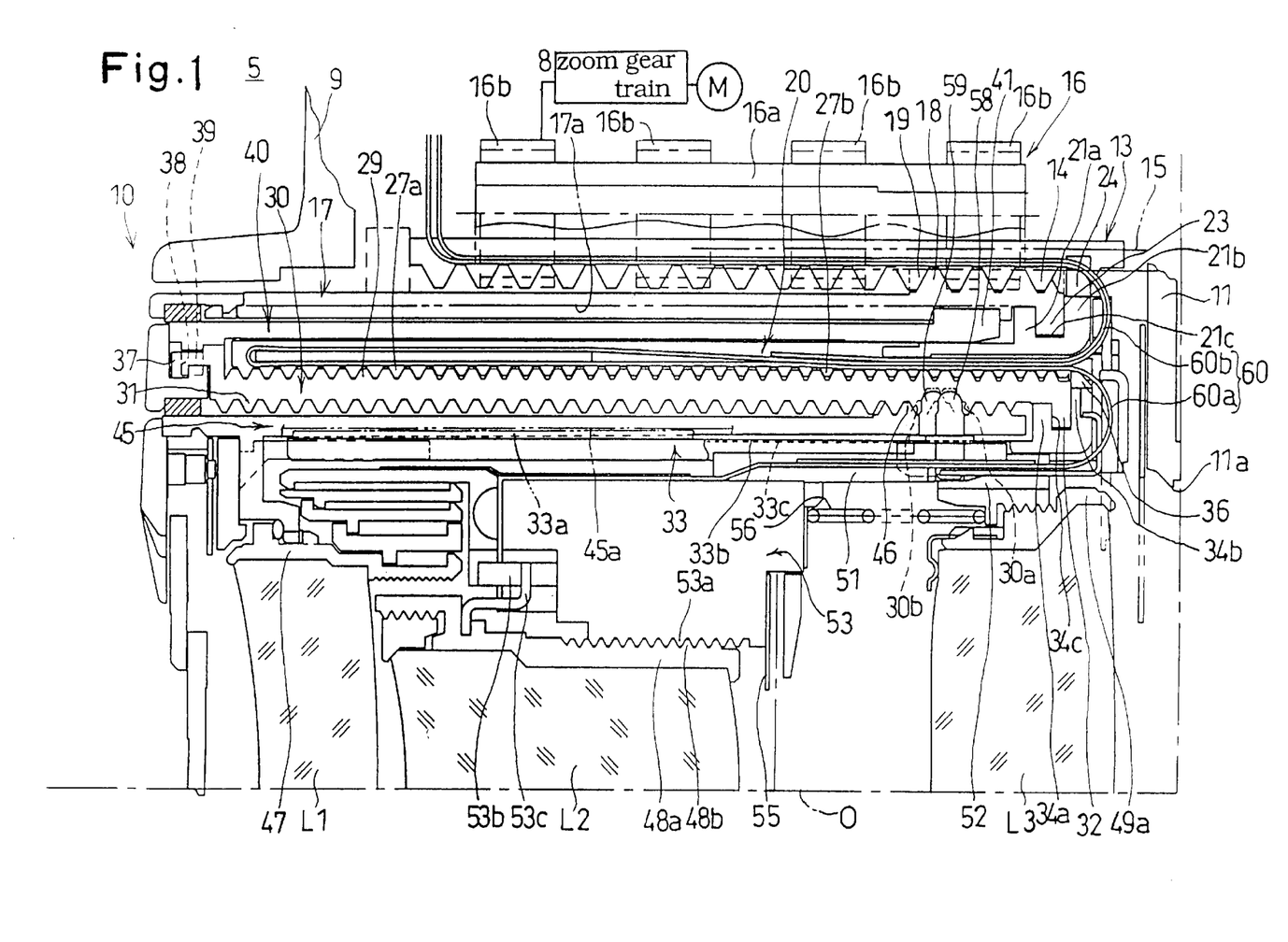
FIG. 1 is a longitudinal sectional view of a zoom lens barrel in a retracted position, according to an embodiment of the present invention.
Figure 2:
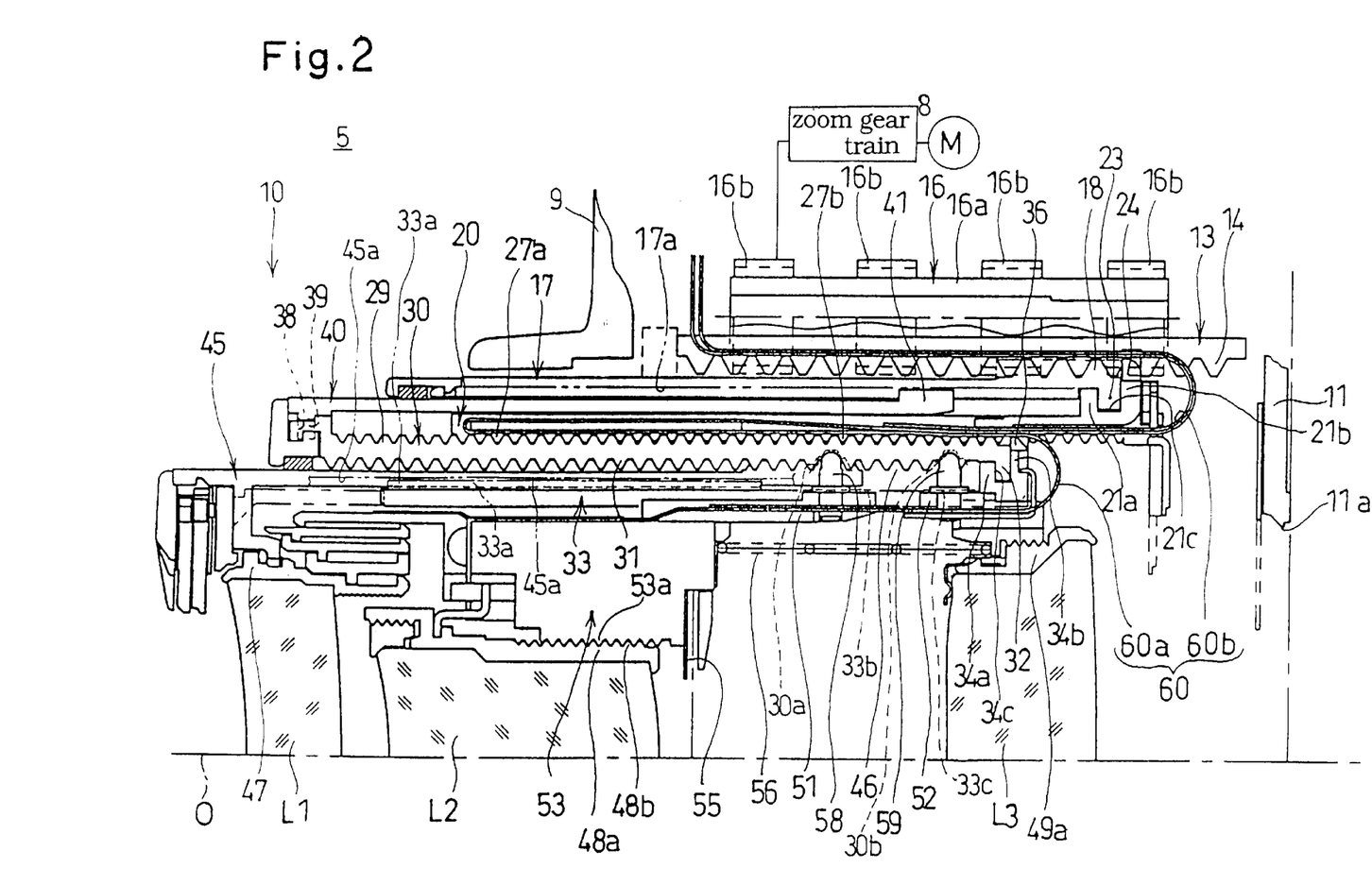
FIG. 2 is a longitudinal sectional view of a zoom lens barrel shown in FIG. 1, at a wide angle extremity.
Figure 3:
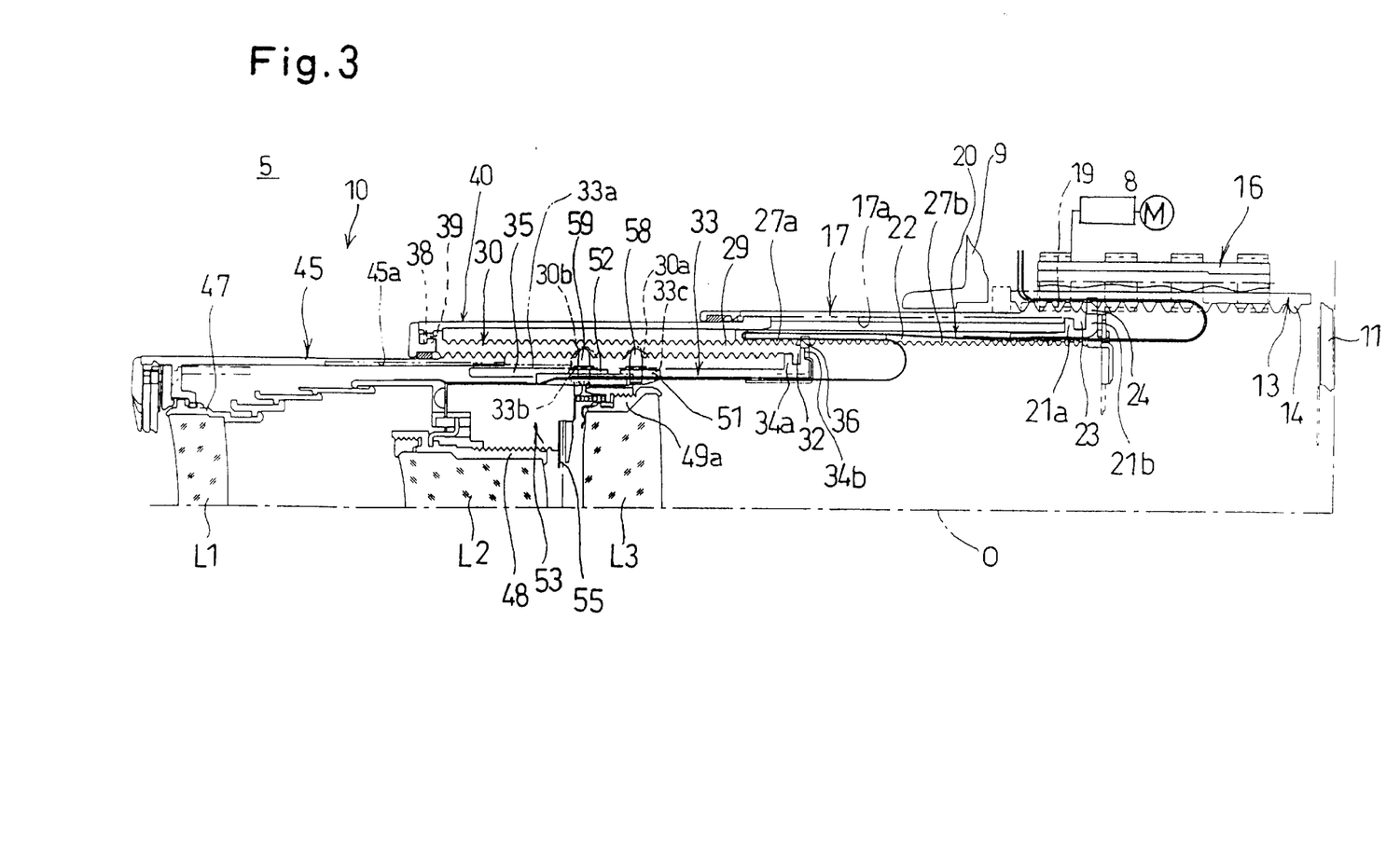
FIG. 3 is a longitudinal sectional view of a zoom lens barrel shown in FIG. 1, at a telephoto extremity.

In FIGS. 1 through 3, a zoom lens barrel 10 can be attached to a camera body 9 of a camera 5 and is composed of a first lens group L1, a second lens group L2, and a third lens group L3. The zooming operation is carried out by varying the distance between the three lens groups and the distance between a film surface and each lens group. The focusing operation is carried out by moving the second lens group L2 in a direction parallel with the optical axis 0. The whole structure and operation of the zoom lens barrel 10 will be discussed below.

An aperture plate 11 is secured in the camera body 9 so that the edge of the aperture plate 11 on the optical axis side defines an aperture 11a which determines the exposure area for a film. A stationary barrel 13 is secured to the camera body 9 in front of the aperture plate 11. The stationary barrel 13 is provided on the inner peripheral surface with a female helicoid (internal helicoid) 14 and a plurality of linear movement guide grooves 15 (FIG. 1) which extend in parallel with the optical axis 0 and which are circumferentially spaced from one another. Note that only one guide groove 15 is shown in FIG. 1.

The stationary barrel 13 is provided on its outer peripheral surface with a zoom gear 16 secured thereto. The zoom gear 16 is comprised of a shaft portion 16a which extends in parallel with the optical axis 0 and which is supported so as to rotate relative to the stationary barrel 13, and a plurality of pinions 16b which are provided on the shaft portion 16a at a predetermined distance in the axial direction. The stationary barrel 13 is provided with cutaway portions (not shown) through which the teeth of the pinions 16b project into the inside of the stationary barrel 13. The drive force of a zoom motor M provided in the camera body 9 is transmitted to the pinions 16b through a zoom gear train 8.

The female helicoid 14 of the stationary barrel 13 is engaged by a male helicoid (external helicoid) 18 formed on the outer peripheral surface of a first outer barrel (first rotational feed barrel) 17. The width of the male helicoid 18 in the direction of the optical axis is such that the male helicoid 18 is not exposed to the outside when the first outer barrel 17 is extended to the most advanced position. The first outer barrel 17 is provided, on the outer peripheral surface thereof on which the male helicoid 18 is formed, with a plurality of outer peripheral gears 19 that extend in parallel with the male helicoid 18. The outer peripheral gears 19 are engaged by the pinions 16b of the zoom gear 16.

A first linear movement guide ring 20 (first linear movement barrel) is provided in the first outer barrel 17. The first linear movement guide ring 20 is provided on the outer peripheral surface at the rear end thereof with a pair of radially projecting parallel flanges 21a, 21b that are spaced from one another to define an annular groove 21c therebetween whose center is located on the optical axis 0. The first outer barrel 17 is provided on the inner peripheral surface at the rear end thereof with a plurality of engaging projections 23 (only one of which is shown in FIG. 1) that project inward (toward the optical axis 0) and that are spaced from one another in the circumferential direction. The thickness of the engaging projections 23 is such that the engaging projections are snugly fitted in the annular groove 21c of the first linear movement guide ring 20 in the axial direction 0 but can slide therein in the circumferential direction. Consequently, when the engaging projections 23 are fitted in the annular groove 21c, the first outer barrel 17 and the first linear movement guide ring 20 are relatively rotatably connected so as not to relatively move in the axial direction. The first linear movement guide ring 20 is provided at the rear end thereof with a plurality of linear movement guide projections 24 at different circumferential positions, that project outward in the radial direction. The linear movement guide projections 24 are slidably engaged in a plurality of linear movement guide grooves 15 formed on the inner peripheral surface of the stationary barrel 13. Consequently, the first linear movement guide ring 20 is moved together with the first outer barrel 17 in the axial direction without rotating relative to the stationary barrel 13 in the circumferential direction about the optical axis 0. Thus, the linear movement of the first linear movement guide ring 20 is guided.

The first outer barrel 17 and the first linear movement guide ring 20 constitute a first feed stage (extension stage) of the zoom lens barrel 10. In the first feed stage, when the zoom gear 16 is rotated in a predetermined direction by the zoom motor M, the first outer barrel 17 is rotated through the pinion 16b and the outer peripheral gear 19, so that the first outer barrel 17 is advanced from the stationary barrel 13 in accordance with the relationship between the female helicoid 14 and the male helicoid 18. At the same time, the first linear movement guide ring 20 is moved together with the first outer barrel 17 relative to the stationary barrel 13 in the axial direction while being linearly guided.

The first linear movement guide ring 20 is equipped on its inner peripheral surface with a female helicoid (internal helicoid) 27 whose inclination direction is the same as that of the female helicoid 14. The female helicoid 27 will be discussed hereinafter.

Figure 4:
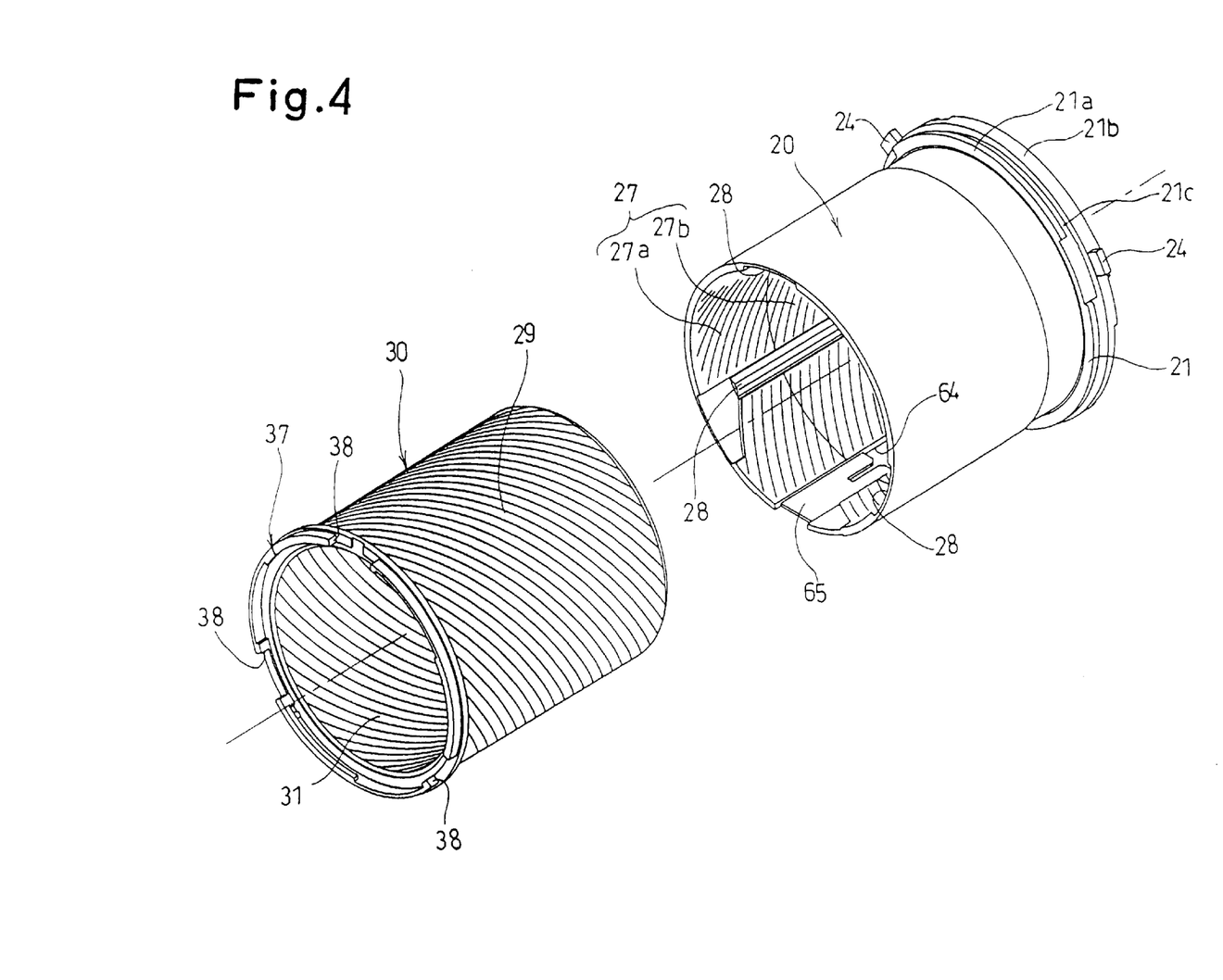
FIG. 4 is a perspective view of a drive cam ring and a first linear movement guide ring.
Figure 5:
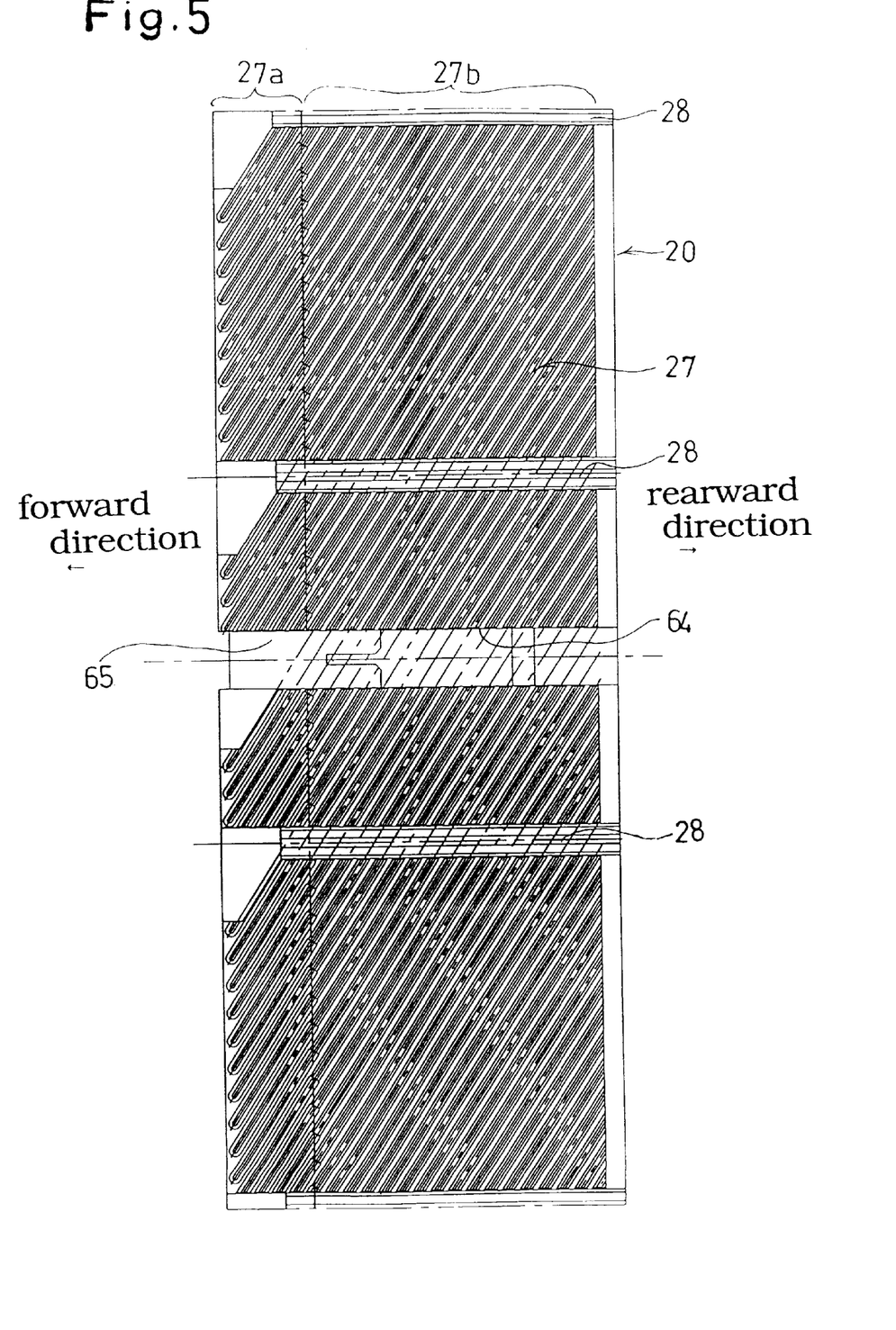
FIG. 5 is a developed view of a female helicoid of a first linear movement guide ring.
Figure 6:
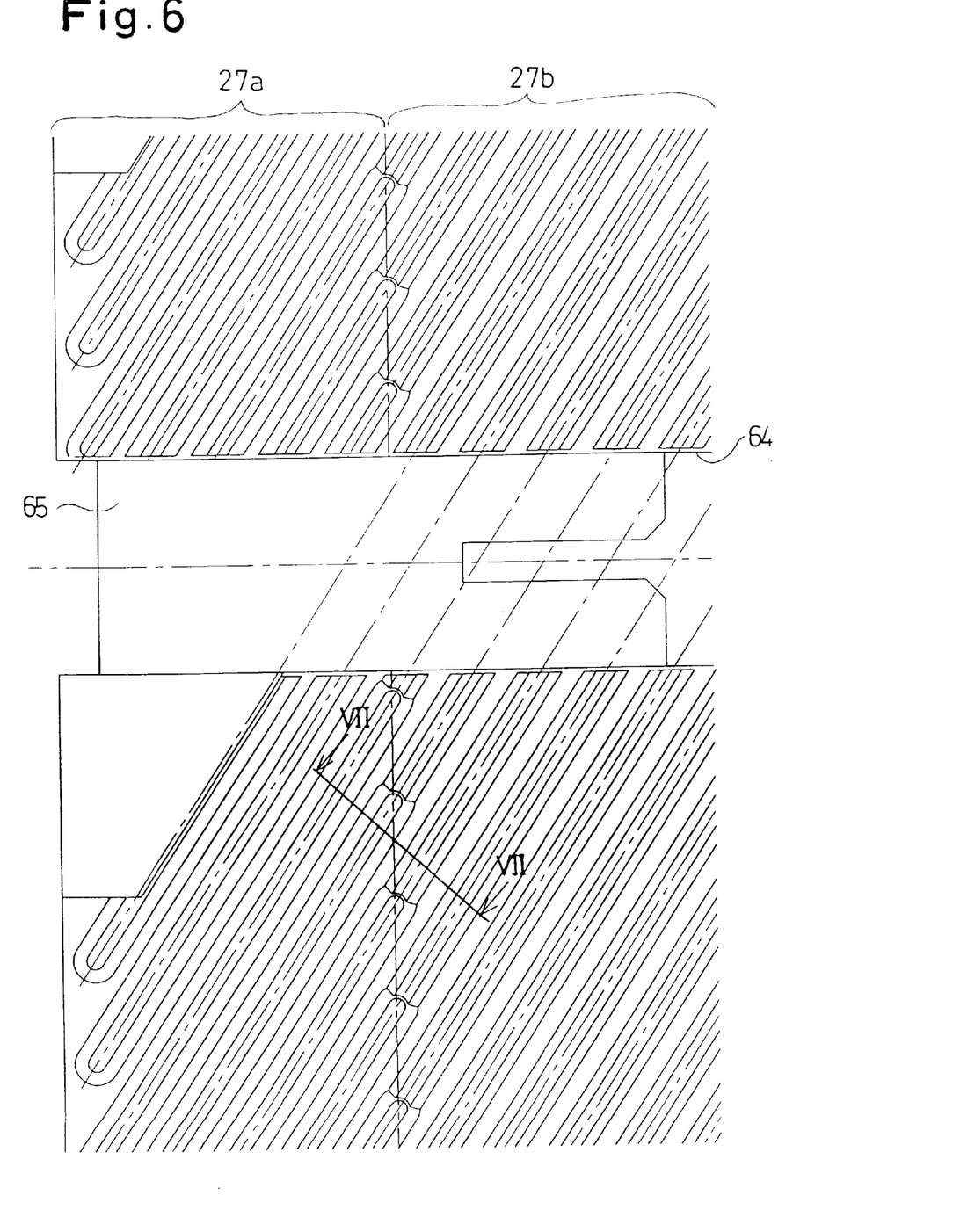
FIG. 6 is an enlarged view of a part of a female helicoid shown in FIG. 5.

The first linear movement guide ring 20 is also provided on its inner peripheral surface with a plurality of linear movement guide grooves (three grooves in the illustrated embodiment) 28 (FIGS. 4 and 5) that extend in parallel with the optical axis 0 and that are spaced from one another at an equi-angular distance in the circumferential direction. A drive cam ring 30 (second rotational feed barrel) is provided in the first linear movement guide ring 20. The drive cam ring 30 is provided on the outer peripheral surface thereof with a male helicoid (external helicoid) 29 which engages with the female helicoid 27. The male helicoid 29 is formed on the entire peripheral surface of the drive cam ring 30. Also, the drive cam ring 30 is provided on its entire inner peripheral surface with a female helicoid (internal helicoid) 31 whose inclination direction is opposite to that of the male helicoid 29. The drive cam ring 30 is also equipped, on the inner peripheral surface at the rear end thereof, with a plurality of engaging projections (only one of which is shown in FIG. 1) 32 that are spaced from one another in the circumferential direction and that protrude in the radial and inward direction (toward the optical axis 0).

A second linear movement guide ring 33 is provided in the drive cam ring 30. The second linear movement guide ring 33 is provided, on the outer peripheral surface at the rear end thereof, with a pair of radially projecting parallel flanges 34a, 34b that are spaced from one another to define an annular groove 34c therebetween whose center is located on the optical axis 0. When the engaging projections 32 provided on the inner peripheral surface of the drive cam ring 30 are fitted in the annular groove 34c, the drive cam ring 30 and the second linear movement guide ring 33 are relatively rotatably connected so as not to relatively move in the axial direction. The second linear movement guide ring 33 is provided at the rear end thereof with a plurality of (e.g., three) linear movement guide projections 36 at different circumferential positions, that project outward in the radial direction. The linear movement guide projections 36 are slidably engaged in a plurality of (e.g., three) linear movement guide grooves 28 formed on the inner peripheral surface of the first linear movement guide ring 20. Consequently, the second linear movement guide ring 33 is linearly guided in the first linear movement guide ring 20 so as not to move relative to the drive cam ring 30 in the direction of the optical axis.

A second outer barrel (rotational transmission barrel) 40 is located between the first outer barrel 17 and the first linear movement guide ring 20 to surround the outer periphery of the drive cam ring 30. A plurality of rotation transmission projections 41 (only one of which is shown in FIG. 1) provided on the outer peripheral surface of the second outer barrel 40 at the rear end thereof are slidably fitted in a plurality of rotation transmission grooves 17a (only one of which is shown in FIG. 1) formed on the inner peripheral surface of the first outer barrel 17 and extending in parallel with the optical axis 0 from the front end to the rear end of the first outer barrel 17. Thus, the second outer barrel 40 is guided so as not to relatively rotate but so as to move relative to the first outer barrel 17 along the optical axis 0.

The drive cam ring 30 is provided on the front end thereof with a rib 37 having three cut-away portions 38. The second outer barrel 40 is equipped, on the inner peripheral surface at the front end thereof, with three engaging projections 39 (only one of which is shown in FIG. 1) that can be engaged in the cut-away portions 38 of the rib 37 and that are spaced from one another in the circumferential direction. The drive cam ring 30 and the second outer barrel 40 are interconnected so as to move together in the direction of the optical axis and to rotate together when the engaging projections 39 are engaged in the cut-away portions 38. Consequently, the second outer barrel 40 is rotated in association with the first outer barrel 17 to transmit the rotation to the drive cam ring 30.

The drive cam ring 30, the second outer barrel 40 and the second linear movement guide ring 33 constitute a second feed stage (extension stage) of the zoom lens barrel 10. When the first outer barrel 17 which constitutes the first feed stage is rotated and extended from the stationary barrel 13, the second outer barrel 40 is rotated in association with the first outer barrel 17 due to the engagement between the rotation transmission grooves 17a and the rotation transmission projections 41. The drive cam ring 30 to which the rotation of the second outer barrel 40 is transmitted is advanced from the first linear movement guide ring 20 together with the second outer barrel 40, while rotating relative to the stationary barrel 13 in the same direction as the first outer barrel 17, in accordance with the engagement between the female helicoid 27 and the male helicoid 29. At the same time, the second linear movement guide ring 33 is moved in the direction of the optical axis together with the drive cam ring 30 while being guided by the first linear movement guide ring 20 in accordance with the engagement between the linear movement guide projections 36 and the linear movement guide grooves 28.

A third outer barrel (second linear movement barrel) 45 is provided in the drive cam ring 30. The second linear movement guide ring 33 is located in the third outer barrel 45. The third outer barrel 45 is guided to move only in the direction of the optical axis relative to the camera body 9 through the second linear movement guide ring 33. To linearly guide the linearly guided outer member of the lens barrel, such as the third outer barrel 45, a conventional guide mechanism can be employed. In the illustrated embodiment, generally U-shaped guide rails 45a and corresponding guide projections 33a are provided on the inner peripheral surface of the third outer barrel 45 and on the outer peripheral surface of the second linear movement guide ring 33, respectively. The guide projections 33a and the guide rails 45a in which the guide projections 33a can be slidably fitted extend in the direction of the optical axis, so that the relative sliding movement therebetween causes the third outer barrel 45 to linearly move. Note that only parts of the guide rails 45a and 33a are shown in the drawings.

The third outer barrel 45 is provided on the outer peripheral surface at the rear end thereof with a male helicoid (external helicoid) 46 which engages with the female helicoid 31 formed on the inner peripheral surface of the drive cam ring 30. Since the third outer barrel 45 is linearly guided by the second linear movement guide ring 33, when the rotation of the drive cam ring 30 takes place, the third outer barrel 45 is advanced relative to the drive cam ring 30 in accordance with the male helicoid 46 and the female helicoid 31. Namely, the third outer barrel 45 constitutes a third feed stage (extension stage) of the lens barrel. The length of the male helicoid 46 in the direction of the optical axis is such that the male helicoid 46 is not exposed to the outside when the third outer barrel 45 is extended to the maximum extension position. A first lens frame 47 which holds the first lens group L1 is secured to the third outer barrel 45.

The second linear movement guide ring 33 is provided with a plurality of axially extending lens guide slits which are formed by cutting away part of the peripheral surface thereof. The lens guide slits is composed of a plurality of second lens guide slits 33b which are adapted to guide the second lens group L2 and a plurality of third lens guide slits 33c which are adapted to guide the third lens group L3. The second lens guide slits 33b and the third lens guide slits 33c are alternately arranged in the circumferential direction. Sliding plates 51 and sliding plates 53 are slidably fitted in the second lens guide slits 33b and the third lens guide slits 33c, respectively. In FIGS. 1 through 3, the sliding plates 51 are located in front of the sliding plates 52, as viewed in the direction perpendicular to the sheet of the drawings. Likewise, the second lens guide slits 33b are located in front of the third lens guide slits 33c. Although only one guide slit 33b, one guide slit 33c, one sliding plate 51 and one sliding plate 52 are shown in the drawings, there are a plurality of guide slits 33b and 33c that are circumferentially spaced from one another and a plurality of sliding plates 51 and 52 that are circumferentially spaced.

The sliding plates 51 are formed integrally with a shutter block 53. Thus, the shutter block 53 is capable of moving only in the direction of the optical axis relative to the third outer barrel 45 which supports the first lens group L1 and the second linear movement guide ring 33. The shutter block 53 is provided with a threaded axial hole (internal thread) 53a in which an external thread 48b of the second lens frame 48a having the second lens group L2 is screw-engaged.

The shutter block 53 includes therein a focusing motor which, upon focusing, drives the second lens frame 48a due to the engagement between the internal thread 53a and the external thread 48b through a drive pin 53b and an association projection 53c in accordance with an object distance signal supplied from a focusing device to thereby move the second lens group L2 in the direction of the optical axis. The shutter block 53 is provided with shutter blades 55 which function also as a diaphragm and which are opened and closed in accordance with an object brightness signal. The shutter block 53 receives drive signals for driving the shutter and the focusing operation, through an FPC (Flexible Printed Circuit) board 60.

The FPC board 60 is composed of a shutter substrate 60a connected to the shutter block 53 and a code plate substrate 60b connected to an encoder (not shown) which detects and produces focal length data. The FPC board 60 is supported by the first linear movement guide ring 20 and the second linear movement guide ring 33 and has a length long enough to permit the extension and retraction of the zoom lens barrel 10.

The sliding plates 52 are formed integrally with the third lens frame 49a which holds the third lens group L3. Consequently, the third lens frame 49a is movable relative to the second linear movement guide ring 33 and the third outer barrel 45 which supports the first lens group L1 only in the direction of the optical axis. The third lens frame 49a and the shutter block 53 are independently slidable along the optical axis 0. A backlash absorbing compression spring 56 is provided between the shutter block 53 (second lens frame 48a) and the third lens frame 49a, so that the shutter block 53 and the third lens frame 49a are biased forward and rearward in the direction of the optical axis, respectively.

The sliding plates 51 integral with the shutter block 53 and the sliding plates 52 integral with the third lens frame 49a are provided with radial guide pins 58 and 59, respectively. The drive cam ring 30 is provided on its inner peripheral surface with a plurality of cam grooves 30a and 30b corresponding to the guide pins, which are formed by cutting away a part of the female helicoid 31. The guide pins 58 and 59 are slidably fitted in the cam grooves 30a and 30b, respectively. The cam grooves 30a for the guide pins 58 and the cam grooves 30b for the guide pins 59 extend non-linearly in the oblique directions with respect to the optical axis. Consequently, the second lens group L2 (shutter block 53) and the third lens group L3 (third lens frame 49a) are relatively moved along the optical axis 0 through the guide pins 58 and 59 when the drive cam ring 30 rotates. Namely, as can be seen in FIGS. 1 through 3, the second lens group L2 is moved forward in the second feed stage (drive cam ring 30) in accordance with the movement of the zoom lens barrel 10 from the retracted position to the wide-angle extremity or from the wide-angle extremity to the telephoto extremity. The third lens group L3 is moved rearward in the second feed stage in accordance with the movement of the zoom lens barrel 10 from the retracted position to the wide-angle extremity and is moved forward in accordance with the movement of the zoom lens barrel from the wide-angle extremity to the telephoto extremity, respectively.

The zoom lens barrel 10 operates as follows. If the zoom motor M is driven in the extension direction of the zoom lens barrel in the retracted position shown in FIG. 1 or in the wide-angle extremity shown in FIG. 2, the first outer barrel 17 is rotated and advanced from the stationary barrel 13. Consequently, the first linear movement guide ring 20 is moved forward together with the first outer barrel 17 while being linearly guided by the stationary barrel 13. As a result, the drive cam ring 30 is advanced together from the second outer barrel 40 from the first linear movement guide ring 20 while rotating in the same direction as the first outer barrel 17. At the same time, the linear movement of the second linear movement guide ring 33 in the axial direction, together with the drive cam ring 30 occurs. When the rotation of the drive cam ring 30 takes place, the second lens group L2 and the third lens group L3 are moved forward in the direction of the optical axis while varying the distance between the second and third lens groups L2 and L3 within the second feed stage, in accordance with the engagement between the guide pins 58 and 59 and the corresponding cam grooves 30a and 30b. Moreover, the third outer barrel 45 which is linearly guided by the second linear movement guide ring 33 is moved forward in the direction of the optical axis in accordance with the rotation of the drive cam ring 30, so that the first lens group L1 is moved forward relative to the second and third lens groups L2 and L3. If the zoom motor M is driven in the retraction direction of the lens barrel at the telephoto extremity shown in FIG. 3, the zoom lens barrel 10 operates in the opposite way to the above-mentioned operation.

As can be seen from the foregoing, in the three-stage feed (extension) type zoom lens barrel 10, the zooming operation is carried out by varying the distance of the first, second and third lens groups L1, L2 and L3 from the film surface and by varying the distance between the lens groups in combination, and the focusing operation is carried out by moving the second lens group L2 in the direction of the optical axis by means of the focusing motor which is driven at a predetermined zoom position, respectively.

As may be understood from the above discussion, in the zoom lens barrel 10, the rotational transmission mechanism which transmits the rotation of the first rotational feed barrel (the first outer barrel 17) to the second rotational feed barrel (the drive cam ring 30) is constituted by the second outer barrel 40 which forms the outer member of the second feed stage. According to this structure, the simplifying of the rotational transmission mechanism for moving the second extension stage can be accomplished. Furthermore, since the drive cam ring 30 is not externally visible, it is possible to provide the male helicoid 29 on the entire outer peripheral surface of the drive cam ring 30. Note that, the above rotational transmission mechanism of the present invention can apply not only to a three-stage extension type feed mechanism, but also to other multi-stage type feed mechanisms (i.e. two-stage or more than four stage extension type).

Moreover, the drive cam ring 30 which forms the second rotational feed barrel is made of a double-helicoid barrel which is provided on the inner and outer peripheral surfaces thereof with helicoids. Hence, a simple feed mechanism is attained, being suitable for a three-stage (multi-stage) extension type zoom lens barrel. In particular, in comparison with the related art in which separate barrel members, each having a helicoid are used in place of the double-helicoid member, such as the drive cam ring 30, the size (space necessary to accommodate the barrel members) and the weight of the zoom lens barrel according to the present invention can be reduced.

The three-stage feed portions of the zoom lens barrel 10 are inter-connected by the utilization of helicoids, providing a greater area of contact than that of a feed mechanism using a cam, thus increasing the strength of the entire zoom lens barrel.

Another feature of the present invention resides in the female helicoid 27 of the first linear movement guide ring 20, which will be discussed below with reference to FIGS. 4 through 7. As mentioned above, the first linear movement guide ring 20 is provided on its inner peripheral surface with the three linear movement guide grooves 28 that extend in parallel with the optical axis 0 and that define three partial cylindrical surface portions between the adjacent guide grooves 28. One of the three partial cylindrical surface portions is provided with an axially extending FPC board insertion hole 64 and an axially extending FPC board securing plate 65. The female helicoid 27 is formed on the cylindrical surface portion other than the linear movement guide grooves 28, the FPC board insertion hole 64, and the FPC board securing plate 65.

The female helicoid 27 includes an annular engaging helicoid portion 27a and an annular non-engaging (lower) helicoid portion 27b. The engaging helicoid portion 27a extends from the front end edge of the first linear movement guide ring 20 by a predetermined length in the axial direction. The non-engaging (lower) helicoid portion 27b extends from the engaging helicoid portion 27a to the rear end of the linear movement guide ring 20. The axes of the threads the engaging helicoid portion 27a are continuously connected to those of the non-engaging helicoid portion 27b at the connection between the helicoid portions 27a and 27b.

Figure 7:
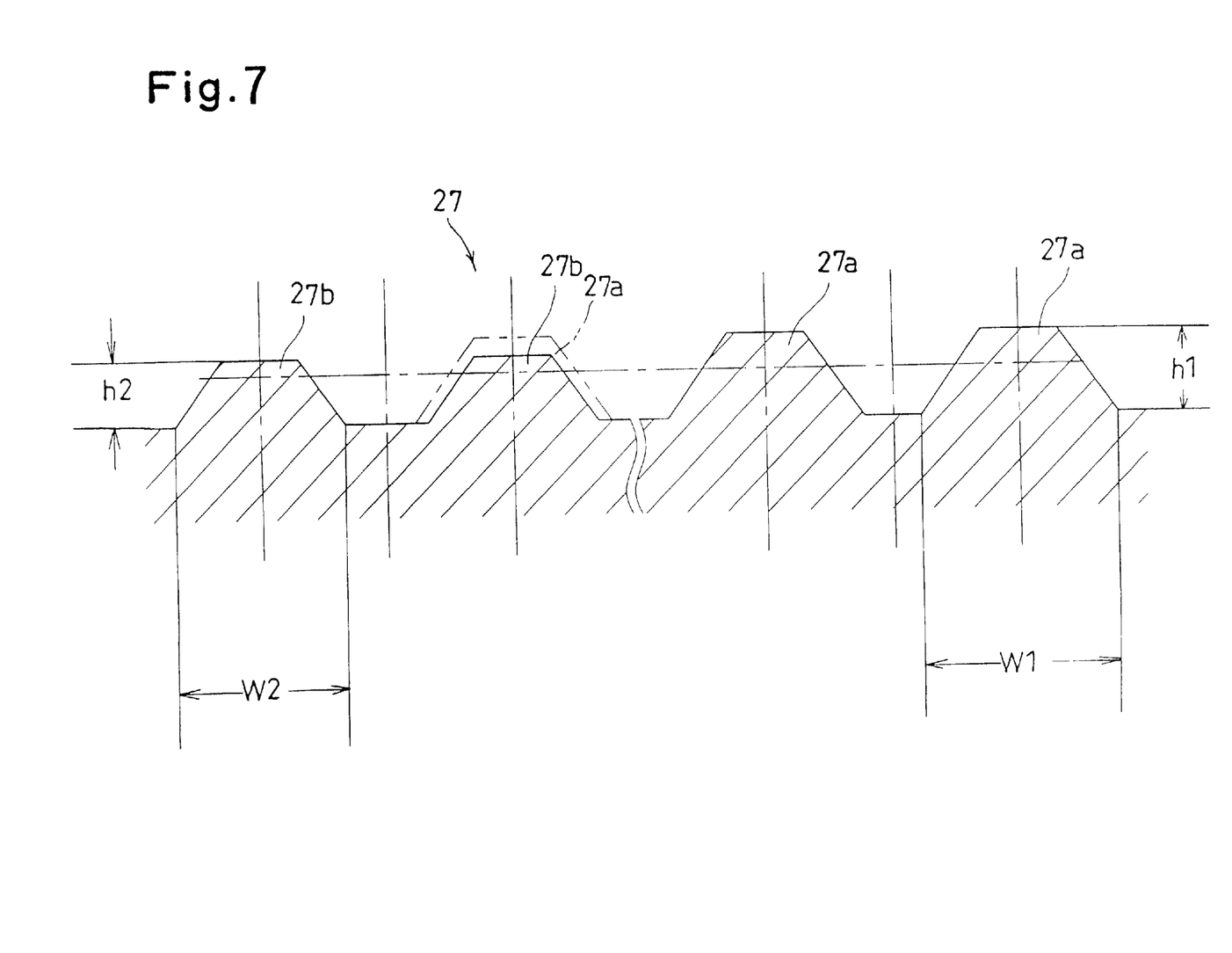
FIG. 7 is a sectional view of a female helicoid, taken along the line VII—VII in FIG. 6.

As can be seen in FIG. 7, the height h2 of the threads of the non-engaging helicoid portion 27b is lower than the height h1 of the threads of the engaging helicoid portion 27a. The width W2 of the threads of the non-engaging helicoid portion 27b at the base thereof is smaller than the width W1 of the threads of the engaging helicoid portion 27a at the base thereof. The shape of the threads of the male helicoid 29 of the drive cam ring 30 is such that they can engage smoothly and tightly with the threads of the engaging helicoid 27a. Namely, there are gaps between the threads of the non-engaging helicoid portion 27b and those of the male helicoid 29, and hence the non-engaging helicoid portion 27b is not in mesh with the male helicoid 29.

The drive cam ring 30 is connected to the first linear movement guide ring 20 through the helicoids, due to the screw engagement between the male helicoid 29 and the engaging helicoid portion 27a of the female helicoid 27. When the drive cam ring 30 rotates relative to the first linear movement guide ring 20 which is guided to linearly move in the direction of the optical axis, the drive cam ring 30 is moved in the direction of the optical axis in accordance with the relationship between the engaging helicoid 27a and the male helicoid 29. Namely, for any pair of cylindrical members which are engaged with each other by means of helicoids formed on the inner and outer peripheral surfaces thereof, the female helicoid 27 (engaging helicoid portion 27a) of the first linear movement guide ring 20 is equivalent to the male helicoid 18 of the first outer barrel 17 or the male helicoid 46 of the third outer barrel 45, at the engaging portion of the peripheral surface of the cylindrical members. Therefore, even if there is a slight dimensional error in the barrel members, no serious problem such as failure to feed the barrel members is caused. Conversely, if the entirety of the female helicoid 27 were made of the engaging helicoid portion (engaging portion) 27a, the length of the engagement of the helicoid would be so long that the probability of failure to engage of the helicoid due to the dimensional error or an interference of the barrel members with the helicoid during the movement thereof would be increased. To prevent this, in the present invention, the non-engaging helicoid portion 27b of the female helicoid 27 is longer in the direction of the optical axis than the engaging helicoid portion 27a, taking into account that the stable engagement of the helicoids can be ensured.

Since the first outer barrel 17 and the third outer barrel 45 are exposed to the outside, the area of the outer peripheral surface in which the helicoids are formed is limited so that the helicoids are not exposed to the outside when the lens barrel is extended at the maximum length. Namely, the portion of the barrel other than the helicoid is thin. Since neither the drive cam ring 30 nor the first linear movement guide ring 20 can be seen from outside, it is possible to form the helicoids on the entire cylindrical surfaces thereof. However, as mentioned above, it is not advisable to provide the engaging portion on the entirety of the cylindrical surface. To this end, the non-engaging helicoid portion 27b is provided, which gives the following advantages. First, since the thickness of the first linear movement guide ring 20 is increased by a value corresponding to the height h2, the strength of the lens barrel can be enhanced. Secondly, the non-engaging helicoid portion 27b does not engage with the male helicoid 29 but has a certain height in the direction perpendicular to the optical axis 0, and hence the non-engaging helicoid portion 27b contributes to a light interception to some extent between the drive cam ring 30 and the first linear movement guide ring 20. Note that since the non-engaging helicoid portion 27b does not increase the diameter of the first linear movement guide ring 20, no non-engaging helicoid portion 27b influences an increase in the size of the lens barrel as a whole.

Although the male helicoid 29 of a uniform height is formed on the entire peripheral surface of the drive cam ring 30, and the female helicoid 27 consisting of the engaging and non-engaging helicoid portions 27a and 27b having different heights is formed on the inner peripheral surface of the first linear movement guide ring 20, in the illustrated embodiment, it is possible to provide the female helicoid consisting of the engaging and non-engaging helicoid portions on the outer peripheral surface of the drive cam ring 30. The reason that the engaging helicoid portion 27a is located adjacent to the front end of the first linear movement guide ring 20 in the direction of the optical axis, in the illustrated embodiment, is to increase the amount of feed in the second feed stage. Likewise, if the non-engaging helicoid portion is provided on the drive cam ring 30, it is preferable that a predetermined length of the engaging helicoid portion be located adjacent to the rear end of the drive cam ring in the direction of the optical axis.

As may be understood from the above discussion, according to the present invention, a multi-stage (in particular three-stage) extension type zoom lens barrel in which the strength thereof is enhanced and the feed mechanism is simplified can be obtained. Moreover, according to the present invention, a helicoid feed type zoom lens barrel in which the strength thereof is increased and light interception efficiency is enhanced while ensuring a smooth movement of the barrel members can be attained.

What is claimed is:

1. A zoom lens barrel comprising:

a stationary barrel that is integral with a camera body;

a first rotational feed barrel which is engaged with said stationary barrel by means of helicoids so as to be movable in the direction of the optical axis upon rotation thereof;

a first linear movement barrel which is located inside of said first rotational feed barrel and which is guided to linearly move in the direction of the optical axis, said first linear movement barrel being engaged with said first rotational feed barrel so as to relatively rotate and to move in the direction of the optical axis together, and said first linear movement barrel being provided on the inner peripheral surface thereof with a female helicoid;

a second rotational feed barrel having a male helicoid and a female helicoid which are provided on the outer and inner peripheral surfaces thereof respectively;

a rotational transmission barrel which is engaged with said first rotational feed barrel so as to relatively move in the direction of the optical axis and to rotate together, and which is integrally connected to said second rotational feed barrel;

a second linear movement barrel which is guided to linearly move in the direction of the optical axis and which is provided on outer peripheral surface thereof with a male helicoid which engages with said female helicoid of said second rotational feed barrel;

a lens group that is held by said second linear movement barrel; and at least one lens group, separate from said second linear movement barrel lens group, which is guided by said second linear movement barrel to linearly move independently of said second linear movement barrel.

2. A zoom lens barrel according to claim 1, wherein a cam groove to determine the position of said at least one lens group is formed on said inner peripheral surface of said second rotational feed barrel by said female helicoid having a cut-out portion.

3. A zoom lens barrel comprising:

a stationary barrel that is integral with a camera body;

a first rotational feed barrel which is engaged with said stationary barrel so as to be moved in the direction of the optical axis upon rotation thereof;

a first linear movement barrel which is located inside of said first rotational feed barrel and which is guided to linearly move in the direction of the optical axis, said first linear movement barrel being engaged with said first rotational feed barrel so as to relatively rotate and to move in the direction of the optical axis together;

a second rotational feed barrel which is engaged with the inside of said first linear movement barrel so as to move in the direction of the optical axis upon rotation thereof; and a rotational transmission barrel located between said first rotational feed barrel and said first linear movement barrel, said rotational transmission barrel being engaged with said first rotational feed barrel so as to relatively move in the direction of the optical axis and to rotate together, and being integrally connected to said second rotational feed barrel.

4. A zoom lens barrel comprising at least a pair of barrel members which includes a first barrel member which is provided on its outer peripheral surface with a male helicoid and a second barrel member having a diameter larger than said first barrel member which is provided on its inner peripheral surface with a female helicoid, so that the feed operation is carried out in accordance with the engagement of said male and female helicoids, wherein one of said male helicoid and said female helicoid comprises:

an engaging helicoid portion and a non-engaging helicoid portion which are provided on separate axial portions of said barrel members;

said engaging helicoid portion being engaged with said helicoid provided on said other barrel member;

said non-engaging helicoid portion not being engaged with said helicoid provided on said other barrel member; and wherein the length of the peripheral surface in which said non-engaging helicoid portion is formed, in the axial direction, is longer than at least the length of said engaging helicoid portion.

5. A zoom lens barrel according to claim 4, wherein said non-engaging helicoid portion is provided on the inner peripheral surface of said second barrel member, and said engaging helicoid portion has a length from the front end of said inner peripheral surface in the axial direction of second barrel member.

6. A zoom lens barrel according to claim 4, wherein said non-engaging helicoid portion is provided on the outer peripheral surface of said first barrel member, and said engaging helicoid portion has a length from the rear end of said outer peripheral surface in the axial direction of said first barrel member.

* * * * *

UNITED STATES PATENT AND TRADEMARK OFFICE
CERTIFICATE OF CORRECTION

PATENT NO. : 6,115,189
DATED : September 5, 2000
INVENTOR(S) : H. NOMURA et al.

It is certified that error appears in the above-identified patent and that said Letters Patent is hereby corrected as shown below:

On the cover of the printed patent, at Item [73], Assignee, after "Kogaku" insert ---Kogyo---.

Signed and Sealed this

Twenty-fourth Day of April, 2001

Attest:

NICHOLAS P. GODICI

Attesting Officer

Acting Director of the United States Patent and Trademark Office